United States Patent
Jankowski

(10) Patent No.: US 7,961,722 B1
(45) Date of Patent: Jun. 14, 2011

(54) MULTIPLE VIRTUALIZED OPERATING ENVIRONMENTS WITHIN A VPN APPLIANCE

(75) Inventor: Steven Jankowski, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 701 days.

(21) Appl. No.: 11/369,714

(22) Filed: Mar. 7, 2006

(51) Int. Cl.
H04L 12/50 (2006.01)
G06F 9/00 (2006.01)

(52) U.S. Cl. ............................ 370/381; 370/401; 726/15

(58) Field of Classification Search .................... None
See application file for complete search history.

(56) References Cited

U.S. PATENT DOCUMENTS

| | | | | |
|---|---|---|---|---|
| 6,079,020 | A * | 6/2000 | Liu ................................. | 726/15 |
| 6,693,878 | B1 * | 2/2004 | Daruwalla et al. ............ | 370/235 |
| 7,486,659 | B1 * | 2/2009 | Unbehagen et al. .......... | 370/392 |
| 2002/0131409 | A1 * | 9/2002 | Frank et al. ................... | 370/386 |
| 2004/0165581 | A1 * | 8/2004 | Oogushi ........................ | 370/401 |
| 2005/0074009 | A1 * | 4/2005 | Kanetake et al. ............. | 370/392 |

OTHER PUBLICATIONS

Bauer,Paranoid Penguin: Linux VPN Technologies, Feb. 2005, Linux Journal, vol. 2005 Issue 130, 1-8.*

* cited by examiner

*Primary Examiner* — Chirag G Shah
*Assistant Examiner* — Joshua Smith
(74) *Attorney, Agent, or Firm* — Shumaker & Sieffert, P.A.

(57) ABSTRACT

A secure socket layer virtual private network (SSL VPN) network appliance includes a set of virtual systems having respective context information. Each of the virtual systems represents a VPN for a different subscriber network. The network appliance includes a network interface to receive a first network communication associated with a first one of the virtual systems. In response to the network communication, the SSL VPN network appliance sets a context identifier that identifies the first one of the virtual systems. The network appliance further comprises a set of VPN software processes executing on the network appliance to process the first network communication, wherein the set of VPN software processes generate data access requests. A configuration access application programming interface (API) dynamically directs the data access requests from the VPN software processes to the first one of the virtual systems based on the context identifier.

23 Claims, 3 Drawing Sheets

MULTIPLE VIRTUALIZED OPERATING ENVIRONMENTS WITHIN A VPN APPLIANCE

TECHNICAL FIELD

The invention relates to computer networks, and, in particular to network appliances.

BACKGROUND

A service provider provides one or more services to subscribers over a computer network. Each of the subscribers may be a corporation or enterprise having a plurality of users. In some instances, a service provider may provide a virtual private network (VPN) or firewall service to its subscribers, thereby allowing the subscribers to avoid installing and maintaining internal VPN devices. For example, the service provider may provide a set of secure socket layer (SSL) VPN appliances that allow each subscriber to provide secure remote access to employees and customers. The SSL VPN appliances hosted by the service provider provide a scalable platform that allows even large enterprises to offer secure extranet, intranet, and LAN access.

In such an environment, the service provider may utilize a separate network device for each subscriber. Each network device provides a separate operating environment for delivery of a different, customer-specific network service, such as SSL VPN services. Another approach may be to provide multiple operating systems on a single device, where each operating system provides a fully independent operating environment for providing a service to a different subscriber. These approaches, however, suffer from scalability and complexity.

SUMMARY

In general, embodiments of the invention provide multiple logically-separated subscriber-specific virtual systems using by a single virtual private network (VPN) appliance without requiring multiple instances of an operating environment. For example, a VPN network device embodying this invention supports multiple data-driven virtual systems, and executes a set of generalized processes capable of providing VPN services to any of the virtual systems.

The network appliance maintains a virtual system "context identifier" to logically direct the processes to one of the different virtual systems at a time. For example, the VPN appliance includes a virtual context application programming interface (API) that provide access to hierarchical customer-specific VPN context information. The API transparently redirects access requests to the appropriate virtual system context information based on the current virtual system context identifier. The virtual system context identifier is transparently passed within any inter-process communications between the generalized processes, and is recorded within timers and other resources of the appliance. In this manner, the generalized set of VPN processes operate according to different virtual systems while preserving logical independence.

In one embodiment, a method comprises maintaining, with a network security device, a set of virtual systems having respective context information, wherein each of the virtual systems provides a virtual private network (VPN) to a different subscriber network. The method further comprises receiving, with the network device, a network communication associated with a first one of the virtual systems, and setting, in response to the network communication, a context identifier identifying the first one of the virtual systems. The method further comprises processing the network communication with a set of VPN software processes, wherein the set of VPN software processes generate data access requests, and dynamically directing data access requests from the VPN software processes to the first one of the virtual systems based on the context identifier.

In another embodiment, a network appliance comprises a set of virtual systems having respective context information, wherein each of the virtual systems represents a virtual private network (VPN) to a different subscriber network. The network appliance further comprises a network interface to receive a first network communication associated with a first one of the virtual systems. In response, the network appliance sets a context identifier is set in response to the network communication that identifies the first one of the virtual systems. The network appliance further comprises a set of VPN software processes executing on the network appliance to process the first network communication, wherein the set of VPN software processes generate data access requests. A configuration access application programming interface (API) dynamically directs the data access requests from the VPN software processes to the first one of the virtual systems based on the context identifier.

In another embodiment, a computer-readable medium comprises instructions. The instructions cause a programmable processor to maintain, with a network security device, a set of virtual systems having respective context information, wherein each of the virtual systems provides a virtual private network (VPN) to a different subscriber network. The instructions further cause the processor to receive, with the network device, a network communication associated with a first one of the virtual systems, and set, in response to the network communication, a context identifier identifying the first one of the virtual systems. The instructions cause the processor to process the network communication with a set of VPN software processes, wherein the set of VPN software processes generate data access requests, and dynamically direct data access requests from the VPN software processes to the first one of the virtual systems based on the context identifier.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
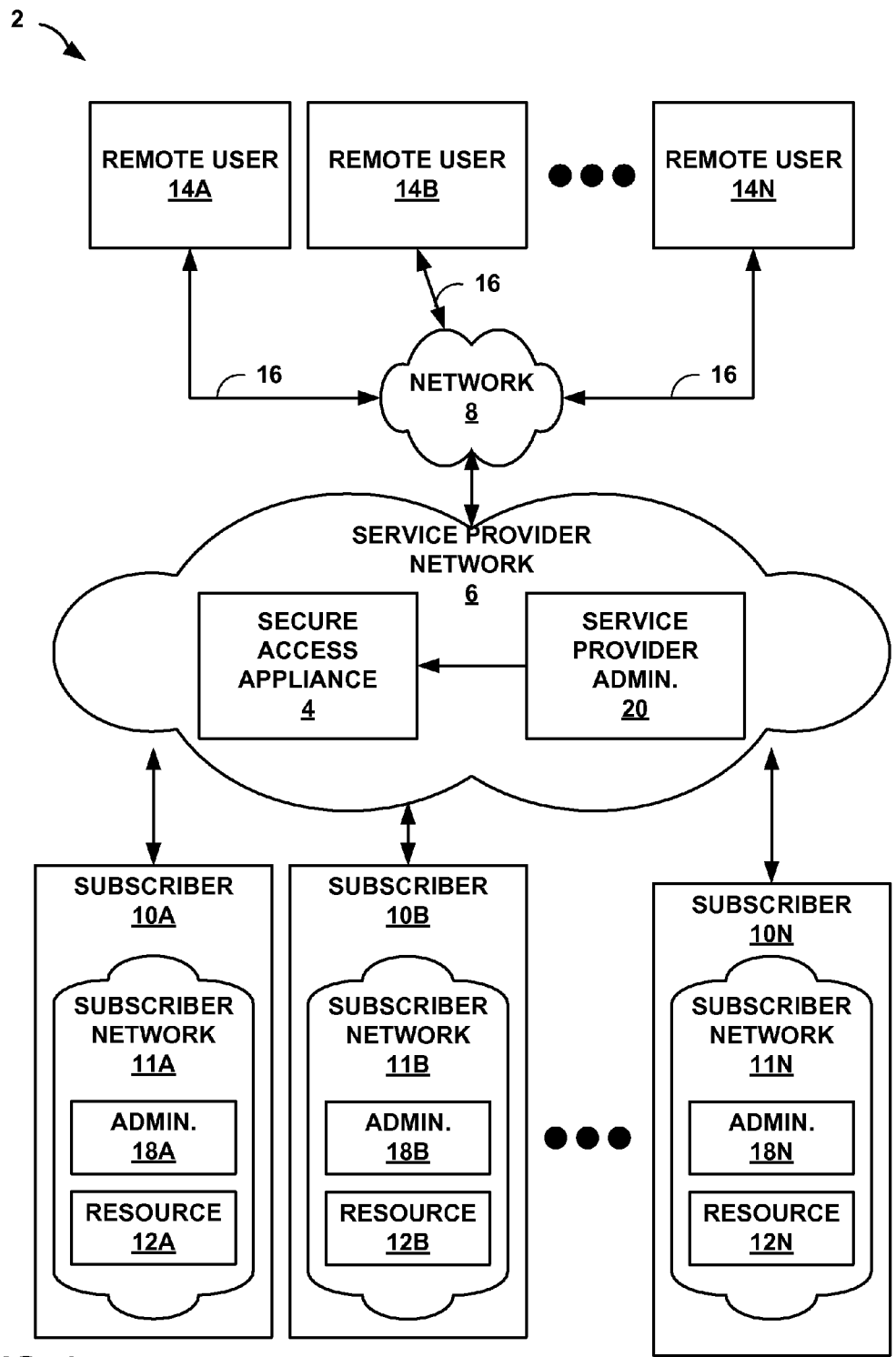
FIG. 1 is a block diagram illustrating an exemplary system in which a secure access appliance processes provides multiple logically-separated, subscriber-specific virtual systems.

FIG. 1 is a block diagram illustrating an exemplary system 2 in which a secure access appliance (SAA) 4 in a service provider network 6 provides virtual systems for subscribers 10A through 10N (collectively, subscribers 10). Network 8 may be any type of computer network. For instance, network 8 may be a local area network or a wide-area network such as the Internet. The subscribers may be corporations, offices, individuals, and so on.

Each of subscribers 10 represents an entity, such as a corporate enterprise, having a corresponding subscriber network 11A through 11N (collectively, subscriber networks 11) that include resources 12A through 12N (collectively, resources 12). Resources 12 may include web servers, file servers, email servers, audio or video servers, printers, faxes, network telephones, set-top boxes, and other network devices.

In one example embodiment, SAA 4 provides Secure Sockets Layer Virtual Private Network (SSL VPN) service for each of subscriber networks 11. More specifically, each of remote users 14A through 14N (collectively, remote users 14) may use the SSL VPN services provided by SAA 4 to remotely access and make use of resources 12 associated with the subscribers 10 to which the individual remote user belongs. For example, remote user 14A is typically an employee or other affiliate of subscriber 10A that is located geographically remotely from the subscriber. Remote user 14A may access resource 12A using the SSL VPN service provided by SAA 4 for subscriber network 11A. Similarly, remote user 14B may access resource 12B using the SSL VPN service provided by SAA 4 for subscriber network 11B.

As described in further detail below, SAA 4 provides multiple logically-separated subscriber-specific virtual systems to provide SSL VPN services to remote users 14. SSA 4 executes a set of generalized software processes capable of providing VPN services to any of the virtual systems. The network appliance maintains a virtual system "context identifier" to logically direct the processes to one of the different virtual systems at a time. The context identifier may be a unique string, number, data path or other information capable eat of uniquely identifying one of the virtual systems provided by the appliance.

At any given point in time, the generalized processes operate within a single SSL VPN context. In essence, the SSL VPN context represents the VPN state data for a single instance of a subscriber-specific SSL VPN. For example, an SSL VPN context may comprise low-level system information such as address ranges and network connectivity information for the specific one of subscribers networks 11. Moreover, an SSL VPN context may comprise subscriber-specific configuration parameters. These subscriber-specific configuration parameters may include granular network, security, and management policies such as a custom authentication, authorization, and accounting protocols, end-point security checks, opened or closed ports, permissible protocols and so on.

SAA 4 includes a virtual context application programming interface (API) that provide access to hierarchically stored, customer-specific VPN context information. The API transparently redirects access requests from the generalized software processes to the appropriate VPN context information based on the current virtual system context identifier. The virtual system context identifier is transparently passed within any inter-process communications between the generalized processes, and is recorded within timers and other resources of the appliance. In this manner, the generalized set of VPN processes are data driven processes capable of operating according to different virtual systems while preserving logical independence between the virtual systems.

In some cases, an SSL VPN context may be formed from subscriber-specific context information as well as shared context information, such as information defined by service provider administrator 20. In other words, in this example, an SSL VPN context for a virtual system in SAA 4 is the union of the subscriber-specific VPN context information and the shared context information. The subscriber-specific context information of an SSL VPN context is specific to a subscriber of SSL VPN service provided by SAA 4. For example, the SSL VPN context for subscriber 10A may contain security policies different from policies defined by the SSL VPN context for subscriber 10B.

The shared context information of an SSL VPN context is common to all SSL VPN contexts on SAA 4. For example, the shared context information may include information relating to a shared network interface, access of a service provider administrator 20 to SAA 4, or information relating to the coordination of subscriber-specific portions of a SSL VPN context.

SAA 4 allows subscriber administrators 18A through 18N (collectively, subscriber administrators 18) to modify configuration information associated with their subscriber-specific VPN context information. By modifying the configuration information associated with a given virtual system, a subscriber administrator 18 may tailor the behavior of an SSL VPN service associated with their particular subscriber network as needed. In general, a subscriber administrator 18 may not modify or view the configuration information associated with another subscriber 10. Thus, from a perspective of a given subscriber 10, it may appear that SAA 4 is dedicated for the sole use of the subscriber.

The principles of this invention extend to services other than SSL VPN services. In other words, the data driven set of generalized process may operate on other forms virtual systems. Other virtual systems may include a virtual extranet service, a point-to-point tunneling protocol VPN service, an authentication service, an authorization service, an accounting service, a firewall service, a traffic engineering service, a network telephony service, an e-business service, and so on.

Embodiments of this invention may present one or more advantages. For instance, a service provider need not maintain a separate device for each of subscriber 10, and may reduce the number of network appliances needed to provide logically-separated subscriber-specific virtual systems. In addition, this system may require less computational resources and provide a more scalable solution than other solutions that use multiple operating systems on a single device to provide logically separate operating environments.

From the subscriber's perspective, SAA 4 may present one or more additional advantages. For example, a subscriber may configure services provided by SAA 4 as though the subscriber is the only user of SAA 4. This may offer the subscriber significantly more flexibility in configuring SAA 4 to the needs of the subscriber. For instance, the ability to flexibly tailor the behavior of SAA 4 may simplify management of personal information for purposes of regulatory compliance. This may provide the subscriber with virtually all of the benefits of a standalone network appliance without having to maintain a device on premises.

Figure 2:
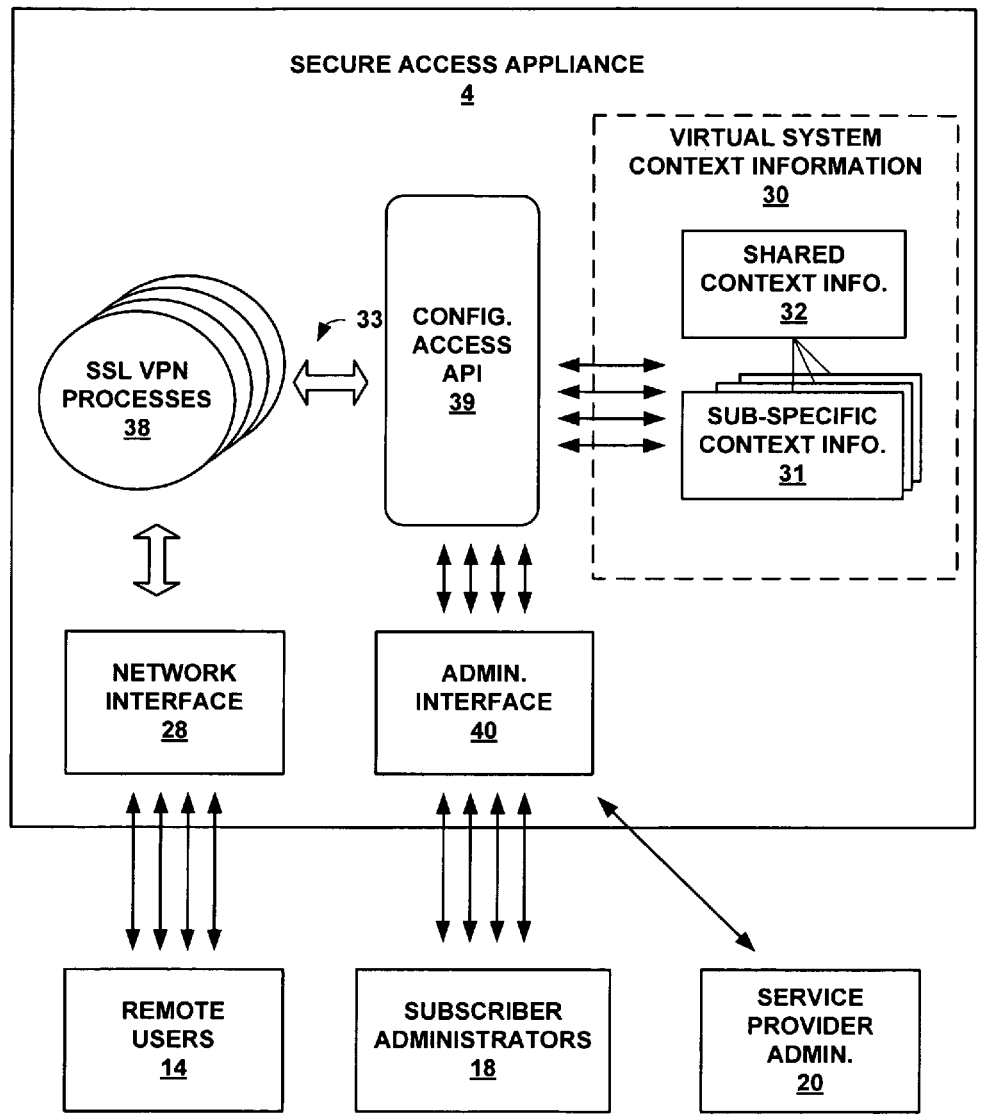
FIG. 2 is a block diagram illustrating an exemplary embodiment of a secure access appliance.

FIG. 2 is a block diagram illustrating an exemplary embodiment of secure access appliance 4 (FIG. 1). In this embodiment, SAA 4 includes virtual system context information 30. Context information 30 may be organized as hierarchy of subscriber-specific context information 31 having a root shared context information 32. Subscriber-specific context information 31 that represents a different virtual system for respective subscribers 10. When combined, a set of subscriber-specific context information 31 and shared context information 32 comprises an SSL VPN context for use by a set of SSL VPN processes 38 that represent a set of generalized (i.e., non customer-specific) processes for providing VPN services. Virtual system context information may be stored within a database, flat file or other data structure.

SAA 4 receives network communications 6 from network 8 through a network interface 40 and directs the communications to the set of SSL VPN processes 38 that provide VPN connectivity for remote users 14. To provide the services, SSL VPN processes 38 operate on the virtual system identified by the current valued of the context identifier. SSL VPN processes 38 transparently pass the VPN context identifier within any inter-process communications between the processes, thereby maintaining consistency by operating on a single virtual system at a time. While processing communications 6 on behalf of a subscriber, one or more of SSL VPN processes 38 generate generic request 33 for portions of context information 30, and each request incorporates the current context identifier. Request 33 may be viewed as generic in that a common interface is used to the request context information for different virtual systems.

Configuration access application programming interface (API) 39 intercepts the access requests 6 and automatically redirects the accesses to the appropriate subscriber-specific context information 31. In other words, configuration access API 39 dynamically directs access requests from each of SSL VPN processes 38 to virtual system context information, e.g., VPN state data and configuration parameters, necessary to support a different, customer-specific virtual system. In other words, configuration access API 39 guarantees logical separation between the virtual systems. Configuration access API 39 returns the requested, subscriber-specific information to the requesting SSL VPN processes 38.

In addition, SAA 4 provides an administrative interface 40 by which subscriber administrators 18 may modify subscriber-specific context information 31. Specifically, SAA 4 receives configuration instructions from subscriber administrators 18 through administrative interface 40, which may present a command line interface (CLI) or a graphical interface. Again, configuration access API 39 intercepts the access requests 6 and automatically redirects the accesses to the appropriate subscriber-specific context information 31. In this manner, subscriber administrators 18 may independently manage configuration data associated with their virtual system without affecting other subscribers. In addition, administrative interface 40 allows service provider administrator 20 to modify shared context information 32.

Figure 3:
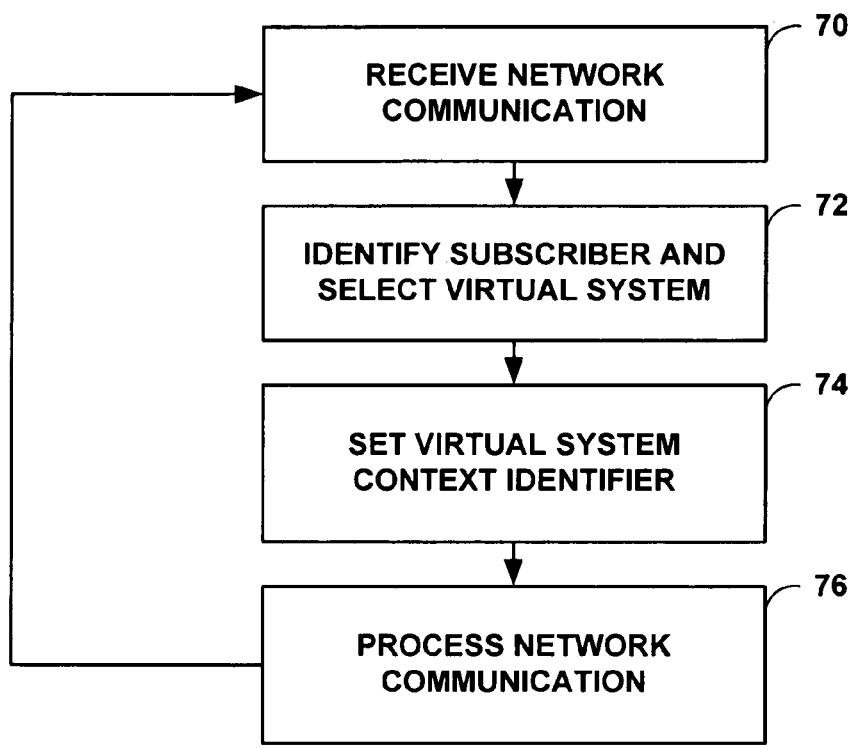
FIG. 3 is a flowchart illustrating an exemplary operation of the secure access appliance in accordance with an embodiment of this invention.

FIG. 3 is a flowchart illustrating an exemplary operation of SSA 4 in accordance with an embodiment of this invention. Initially, SSA 4 receives a network communication from network interface 28 (70). For example, SSA 4 may receive an inbound network communication from one of remote users 14 destined for one of subscriber networks 10. In this case, SSA 4 may receive an encrypted communication over an SSL session having termination points at SSA 4 and at the remote user 14. Alternatively, SSA 4 may receive a clear text (i.e., unencrypted) outbound communication from one of subscriber networks 10 and destined for one of remote users 14.

After receiving the network communication, SSA 4 determines which subscriber 10 and, more specifically, which virtual system supported by the SSA is associated with the network communication. For example, SSA 4 may use a subscriber context map to map a source or destination address specified within the network communication to a particular virtual system (72).

Once SSA 4 has determined particular virtual system associated with the network communication, the SSA sets the virtual system context identifier to control subsequent processing of the communication (74). Next, SSL VPN processes 38 process the network communication in accordance with the context information 30 for the particular virtual system with which the communication is associated (76).

For example, for outbound messages, the SSL VPN processes 38 may access the virtual system context information 30 to retrieve the correct SSL encryption keys and session information for SSL sessions maintained with remote users 14. As described above, configuration access API 39 transparently redirects data access requests from the generalized SSL VPN processes 38 to the subscriber-specific VPN context information 31 based on the current virtual system context identifier shared between the processes 38. For example, each data access request 33 may specify an access path based on the particular data being sought. Based on the context identifier, configuration access API 39 may dynamically modify the access path specified within the data access request to direct the data access request to the context information associated with the virtual system associated with the communication being processed.

SSL VPN processes 38 utilize the subscriber-specific VPN context information 38 to encrypt the outbound data, and forward the encrypted data using the appropriate session information for the current virtual system.

Similarly, for inbound messages, the SSL VPN processes 38 may access the virtual system context information 30 to retrieve the correct SSL encryption keys and session information for SSL sessions based on the current context identifier. SSL VPN processes 38 utilize the subscriber-specific VPN context information 38 to retrieve the inbound data from the SSL session and decrypt the inbound data using the appropriate keys for the current context. The SSL VPN processes 38 then forward the decrypted data to the appropriate resource 12 for the corresponding subscriber network 11.

Various embodiments of the invention have been described. These and other embodiments are within the scope of the following claims.

The invention claimed is:
1. A method comprising:
maintaining, with a network security device, a plurality of logically separated virtual systems having respective context information, wherein each of the virtual systems comprises a data structure for storing the context information for providing a corresponding virtual private network (VPN) to each subscriber network, wherein the context information for each of the virtual systems comprises session information and configuration parameters that include security policies and a secure socket layer (SSL) encryption key for the respective VPN;
receiving, with the network security device, a network communication associated with a first one of the virtual systems from a first one of the subscriber networks;
setting, in response to the network communication, a context identifier identifying the first one of the virtual systems;
processing the network communication with a first one of a plurality of VPN software processes executing on the network security device, wherein each of the VPN software processes corresponds to a different one of the virtual systems of the network security device and provides the corresponding VPN to each subscriber network, and wherein the first one of the VPN software processes generates a data access request to include the context identifier in response to the network communication;
dynamically directing the data access request from the first one of the plurality of VPN software processes to the first one of the virtual systems with a generic application programming interface (API) based on the context identifier included within the data access request to retrieve the SSL encryption key and the session information for the corresponding VPN; and applying VPN services with the first one of the plurality of VPN software processes to the network communication in accordance with the context information associated with the first one of the virtual systems to which the data access request is directed in order to provide VPN connectivity to the first one of the subscriber networks by at least encrypting or decrypting the network communication based on the retrieved SSL encryption key and session information and to enforce the security policies defined within the context information.

2. The method of claim 1, wherein maintaining the plurality of logically separated virtual systems comprises:
maintaining subscriber-specific context information for each of the virtual systems; and
maintaining shared context information, wherein the shared context includes information that is common to each of the virtual systems.

3. The method of claim 2, wherein processing the network communication includes processing the network communication in accordance with the subscriber-specific context information associated with the first one of the subscriber networks and the shared context information.

4. The method of claim 1, further comprising:
receiving requests from administrators associated with the different subscriber networks to modify the context information for their corresponding virtual systems;
dynamically directing each of the requests to the corresponding virtual system associated with the respective administrator from which the request was received.

5. The method of claim 1, wherein the configuration parameters comprise customer-specific security policies.

6. The method of claim 1, wherein setting the context identifier comprises:
identifying a network address of the network communication; and
accessing a context map to map the address to a particular one of the virtual systems maintained by the security device.

7. The method of claim 1, wherein processing the network communication comprises embedding the context identifier within inter-process communications issued between the VPN software processes.

8. The method of claim 1, wherein dynamically directing the data access request comprises:
invoking the generic application programming interface (API) with the data access requests from the VPN software processes;
identifying, with the generic API, the corresponding one of the plurality of virtual systems that is associated with the first one of the subscriber networks based on the context identifier; and
modifying an access path specified within the request to direct the data access requests to the context information associated with the corresponding one of the plurality of virtual systems.

9. The method of claim 1,
wherein the network communication comprises an inbound network communication received from a remote user associated with the first one of the subscriber networks, and wherein applying VPN services comprises:
decrypting the network communication to produce unencrypted data based on the retrieved SSL encryption key and session information; and
forwarding the unencrypted data to a network resource associated with the first one of the subscriber networks.

10. The method of claim 1,
wherein the network communication comprises an outbound network communication destined for a remote user associated with the first one of the subscriber networks, and wherein applying VPN services comprises:
encrypting the network communication to produce encrypted data based on the retrieved SSL encryption key and session information; and
forwarding the encrypted data to the remote user via an SSL session.

11. A network security device comprising:
a processor;
a plurality of logically separated virtual systems having respective context information, wherein each of the virtual systems comprises a data structure for storing the context information for providing a corresponding virtual private network (VPN) to each subscriber network, wherein the context information for each of the virtual systems comprises session information and configuration parameters that include security policies and a secure socket layer (SSL) encryption key for the respective VPN;
a network interface to receive a first network communication associated with a first one of the virtual systems from a first one of the subscriber networks;
a context identifier set in response to the first network communication and identifying the first one of the virtual systems;
a plurality of VPN software processes executing on the processor of the network security device to process network communications, wherein each of the VPN software processes corresponds to a different one of the virtual systems and provides the corresponding VPN to each subscriber network, wherein a first one of the plurality of VPN software processes generates a data access request to include the context identifier in response to the first network communication, and wherein the first one of the plurality of VPN software processes applies VPN services to the first network communication in accordance with the context information of the corresponding one of the virtual systems to which the data access request is directed in order to provide VPN connectivity to the first one of the subscriber networks by at least encrypting or decrypting the network communication based on the SSL encryption key and the session information of the corresponding VPN and to enforce the security policies defined within the context information; and
a configuration access application programming interface (API) executing on the network appliance that dynamically directs the data access request from the first one of the plurality of VPN software processes to the first one of the virtual systems based on the context identifier included within the data access request to retrieve the SSL encryption key and the session information for the corresponding VPN.

12. The network security device of claim 11, further comprising a hierarchically organized database storing subscriber-specific context information for each of the virtual system, and shared context information common to each of the virtual systems.

13. The network security device of claim 12, wherein the plurality of VPN software processes process the first network communication in accordance with the subscriber-specific context information associated with the first one of the subscriber networks and the shared context information.

14. The network security device of claim 11, further comprising an administrative interface to administrators associated with different subscriber networks to modify the context information for their corresponding virtual systems,
wherein the configuration access API dynamically directs each of the requests to the corresponding virtual system associated with the respective administrator from which the request was received.

15. The network security device of claim 11, wherein the configuration parameters comprise customer-specific security policies.

16. The network security device of claim 11, further comprising a context map that maps network addresses to the virtual systems maintained by the network appliance.

17. The network security device of claim 11, wherein the plurality of VPN software processes embed the context identifier within inter-process communications issued between the VPN software processes.

18. The network security device of claim 11, the API comprises a generic API that identifies the corresponding one of the plurality of virtual systems based on the context identifier and modifies an access path specified within the data access request to direct the data access request to the context information associated with the corresponding one of the plurality of virtual systems.

19. The network security device of claim 11,
wherein the first network communication comprises an inbound network communication received from a remote user associated with the first one of the subscriber networks,
wherein the first one of the plurality of VPN software processes decrypts the network communication to produce unencrypted data based on the retrieved SSL encryption key and session information, and forwards the unencrypted data to a network resource associated with the first one of the subscriber networks.

20. The network security device of claim 11,
wherein the first network communication comprises an outbound network communication destined for a remote user associated with the first one of the subscriber networks,
wherein the first one of the plurality of VPN software processes encrypts the network communication to produce encrypted data based on the retrieved SSL encryption key and session information, and forward the encrypted data to the remote user via an SSL session.

21. A non-transitory computer readable medium comprising instructions that cause a programmable processor to:
maintain, with a network security device, a plurality of logically separated virtual systems having respective context information, wherein each of the virtual systems comprises a data structure for storing the context information for providing a corresponding virtual private network (VPN) to a each subscriber network, wherein the context information comprises session information and configuration parameters that include security policies and a secure socket layer (SSL) encryption key for the respective VPN;
receive, with the network device, a network communication associated with a first one of the virtual systems from a first one of the subscriber networks;
set, in response to the network communication, a context identifier identifying the first one of the virtual systems;
process the network communication with a first one of a plurality of VPN software processes executing on the network security device, wherein each of the VPN software processes corresponds to a different one of the virtual systems of the network security device and provides the corresponding VPN to each subscriber network, and wherein the first one of the VPN software processes generates a data access request;
dynamically direct the data access request from the first one of the plurality of VPN software processes to the first one of the virtual systems with a configuration access application programming interface (API) based on the context identifier to retrieve the SSL encryption key and the session information for the corresponding VPN; and
apply VPN services with the first one of the plurality of VPN software processes to the network communication in accordance with the context information associated with the first one of the virtual systems to which the data access request is directed in order to provide VPN connectivity to the first one of the subscriber networks by at least encrypting or decrypting the network communication based on the retrieved SSL encryption key and session information and to enforce the security policies defined within the context information.

22. The method of claim 1, wherein the context information for each of the virtual systems comprises one or more of VPN state information, network policies, management policies, security policies, configuration information, end-point security checks, permissible protocols, and custom authentication, authorization, and accounting protocols.

23. The network security device of claim 11, wherein the context information for each of the virtual systems comprises one or more of VPN state information, network policies, management policies, security policies, configuration information, end-point security checks, permissible protocols, and custom authentication, authorization, and accounting protocols.

* * * * *

UNITED STATES PATENT AND TRADEMARK OFFICE
CERTIFICATE OF CORRECTION

PATENT NO.      : 7,961,722 B1
APPLICATION NO. : 11/369714
DATED           : June 14, 2011
INVENTOR(S)     : Steve Jankowski It is certified that error appears in the above-identified patent and that said Letters Patent is hereby corrected as shown below:

Column 8, line 61 (Claim 12): "system," should be -- systems, --

Column 9, line 30 (Claim 19): "networks," should be -- networks, and --

Column 9, line 41 (Claim 20): "works," should be -- works, and --

Column 10, line 3 (Claim 21): "to a each subscriber network," should be -- to a subscriber network, --

Signed and Sealed this
Thirteenth Day of March, 2012

David J. Kappos
*Director of the United States Patent and Trademark Office*